(12) United States Patent
Kataoka

(10) Patent No.: US 8,117,590 B2
(45) Date of Patent: Feb. 14, 2012

(54) PROGRAM DEVELOPING APPARATUS, PROGRAM DEVELOPING METHOD AND COMPUTER READABLE MEDIUM

(75) Inventor: Yoshio Kataoka, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1059 days.

(21) Appl. No.: 12/017,734

(22) Filed: Jan. 22, 2008

(65) Prior Publication Data
US 2008/0184196 A1 Jul. 31, 2008

(30) Foreign Application Priority Data
Jan. 30, 2007 (JP) ................................ 2007-019251

(51) Int. Cl.
G06F 9/44 (2006.01)
(52) U.S. Cl. ...................................................... 717/107
(58) Field of Classification Search .................. 717/107
See application file for complete search history.

(56) References Cited

U.S. PATENT DOCUMENTS

| | | | | |
|---|---|---|---|---|
| 5,652,899 A | * | 7/1997 | Mays et al. | 715/239 |
| 5,793,369 A | * | 8/1998 | Atkins et al. | 715/787 |
| 7,174,536 B1 | * | 2/2007 | Kothari et al. | 717/109 |
| 7,620,946 B2 | * | 11/2009 | Russell | 717/157 |
| 2004/0226006 A1 | * | 11/2004 | Russell | 717/154 |
| 2007/0016894 A1 | * | 1/2007 | Sreedhar | 717/131 |

OTHER PUBLICATIONS

Xu et al., "A Brief Survey of Program Slicing", Mar. 2005, ACM SIGSOFT Software Engineering Notes, vol. 30, No. 2, pp. 1-36.*
Weiser, Program Slicing, IEEE Trans. on Software Engineering, SE-10(4) 1984, pp. 352-357.

* cited by examiner

*Primary Examiner* — Philip Wang
(74) *Attorney, Agent, or Firm* — Turocy & Watson, LLP

(57) ABSTRACT

There is provided a method including: dividing codes included in a first source code into a plurality of groups virtually; partitioning each arranged group into one or more sections made up of one or more codes which should be sequentially executed; store the sections in a storage; setting constraints of an execution order among the sections on a basis of the first source code; exhibiting contents of the storage to a user; exhibiting constraint information representing the constraints of the execution order to the user; editing the contents of the storage based on a first editing command from the user; editing the constraint information based on a second editing command from the user; and synthesizing the first source code and edited contents of the storage into a second source code according to edited constraint information.

21 Claims, 6 Drawing Sheets

PROGRAM DEVELOPING APPARATUS, PROGRAM DEVELOPING METHOD AND COMPUTER READABLE MEDIUM

CROSS-REFERENCE TO RELATED APPLICATIONS

This application is based upon and claims the benefit of priority from the prior Japanese Patent Applications No. 2007-19251 filed on Jan. 30, 2007, the entire contents of which are incorporated herein by reference.

BACKGROUND OF THE INVENTION

1. Field of the Invention

The present invention relates to a program developing apparatus, a program developing method and a computer readable medium for efficiently maintaining software, such as firmware used in an embedded device having limited computer resources such as a memory and a processor, while retaining runtime performance.

2. Related Art

In development of firmware used in an embedded device having limited resources, since performance requirements are highly prioritized, the development is often performed giving priority to execution efficiency, such as performing the development in a low-level language and performing an implementation at the sacrifice of nonfunctional quality for increasing software maintainability.

The term "Resources" herein means the performance or the amount, of a memory or processor. For example, in the development of the firmware for the embedded device in which these are extremely limited, the implementation is often performed with a high regard for the performance. In other words, sometimes coding is performed directly in a machine language. Also, even if a high-level language such as C is used, an implementation with a module group having low cohesion and high coupling is often seen, which is performed at the sacrifice of nonfunctional requirements such as portability, maintainability and readability. When addition or correction of functions is attempted with respect to such an implementation, it is difficult to forecast which part is appropriate to be corrected and the like, and it is frequently seen that many man-hours are required or defects are often caused.

Incidentally, the coupling and the cohesion are examples of measures for evaluating quality of the software. The coupling is a measure for measuring strength of linkage and interdependency among components of a program. From the viewpoint of the software maintainability, low coupling, that is, less interdependency of the components is regarded as preferable. It is because when maintenance tasks are performed with respect to the components having high coupling with others, it is necessary to consider effects on other components. As an example of the coupling measure, a measure referred to as "CBO" of CK metrics can be quoted.

On the other hand, the cohesion is a measure for measuring scale of cohesiveness of functions in the components of the program. As is expected, from the viewpoint of the software maintainability, high cohesion, that is, large scale of cohesiveness of the functions is regarded as preferable. A component having low cohesion means a state in which multiple roles or functions are overlapped, and it means that an attempt to correct one function in the component is likely to affect other functions or roles included therein. As an example of the cohesion measure, a measure referred to as "LCOM" of CK metrics can be quoted.

As described above, there have been various problems with the addition or the correction of the functions in the implementation at the sacrifice of the nonfunctional requirements. However, conversely, in an implementation having appropriate redundancy which is regarded as ideal in terms of software engineering, there has also been a problem in which flexibility in performance control, in which delicate performance requirements required for the firmware can be accommodated, is limited and the performance is not achieved.

An essential solution for such problems has not been proposed so far. For example, many source code analyzing techniques for reading and solving complex source codes have been proposed. Slicing technology and the like have been established as techniques for decomposing functions in the source code, and a research for using this to convert the source code into a state of high readability has been also performed. However, this is one-way conversion, and can only provide a function only for reading and solving the source code.

Also, many techniques for conversely generating codes having high execution efficiency from the codes having high readability have been proposed, such as a compiler optimization technique. However, notwithstanding, mechanical optimization has limitations and does not come up to a result of performing fine adjustment at a source code level by human. Conversely, since there is also a case where the development in which there is no mistake in debugging or function verification can be performed rather by performing extreme optimization at the source code level without using a compiler optimization option, the compiler optimization technique is a technique which is not so appropriate.

In addition, there is an approach for increasing the maintainability by previously combining pieces of the code having high modularity, that is, having high cohesion and low coupling (for example, U.S. Pat. No. 6,694,505). However, primarily, this is such a technique that cannot be used in the case of low modularity, and is not appropriate for the problems as shown herein. Moreover, there is also such a technique that improves productivity by visualizing an architecture of target software and presenting it (for example, U.S. Patent Publication No. 2004-0031015). However, this cannot be applied to the case where there is no explicitly arranged architecture as intended this time, either.

Basically, development of resource-limited software significantly depends on a result of manual optimization at a source code level. There is a problem in which a source code optimized in this way has extremely low maintainability, and it has been very difficult to perform maintenance, not only for a third party but also even for an author of the original in some cases.

SUMMARY OF THE INVENTION

According to an aspect of the present invention, there is provided with a program developing apparatus comprising:

a dividing unit configured to divide codes included in a first source code into a plurality of groups virtually;

a partitioning unit configured to partition each group into one or more sections made up of one or more codes which should be sequentially executed;

a storage configured to store the sections, each having one or more codes;

a setting unit configured to set constraints of an execution order among the sections on a basis of the first source code;

a first exhibiting unit configured to exhibit contents of the storage to a user;

a second exhibiting unit configured to exhibit constraint information representing the constraints of the execution order to the user;

a first editing unit configured to edit the contents of the storage based on a first editing command from the user;

a second editing unit configured to edit the constraint information based on a second editing command from the user; and a synthesizing unit configured to synthesize the contents of the storage after being edited according to edited constraint information into a second source code.

According to an aspect of the present invention, there is provided with a program developing method comprising:

dividing codes included in a first source code into a plurality of groups virtually;

partitioning each group into one or more sections made up of one or more codes which should be sequentially executed;

store the sections, each having one or more codes, in a storage;

setting constraints of an execution order among the sections on a basis of the first source code;

exhibiting contents of the storage to a user;

exhibiting constraint information representing the constraints of the execution order to the user;

editing the contents of the storage based on a first editing command from the user;

editing the constraint information based on a second editing command from the user; and synthesizing the first source code and edited contents of the storage into a second source code according to edited constraint information.

According to an aspect of the present invention, there is provided with a computer readable medium storing a computer program for causing a computer to execute instructions to perform the steps of:

dividing codes included in a first source code into a plurality of groups virtually;

partitioning each group into one or more sections made up of one or more codes which should be sequentially executed;

store the sections, each having one or more codes, in a storage;

setting constraints of an execution order among the sections on a basis of the first source code;

exhibiting contents of the storage to a user;

exhibiting constraint information representing the constraints of the execution order to the user;

editing the contents of the storage based on a first editing command from the user;

editing the constraint information based on a second editing command from the user; and synthesizing the first source code and edited contents of the storage into a second source code according to edited constraint information.

DETAILED DESCRIPTION OF THE INVENTION

Embodiments of a software high productivity developing environment according to the present invention will be described with reference to the drawings.

Figure 1:
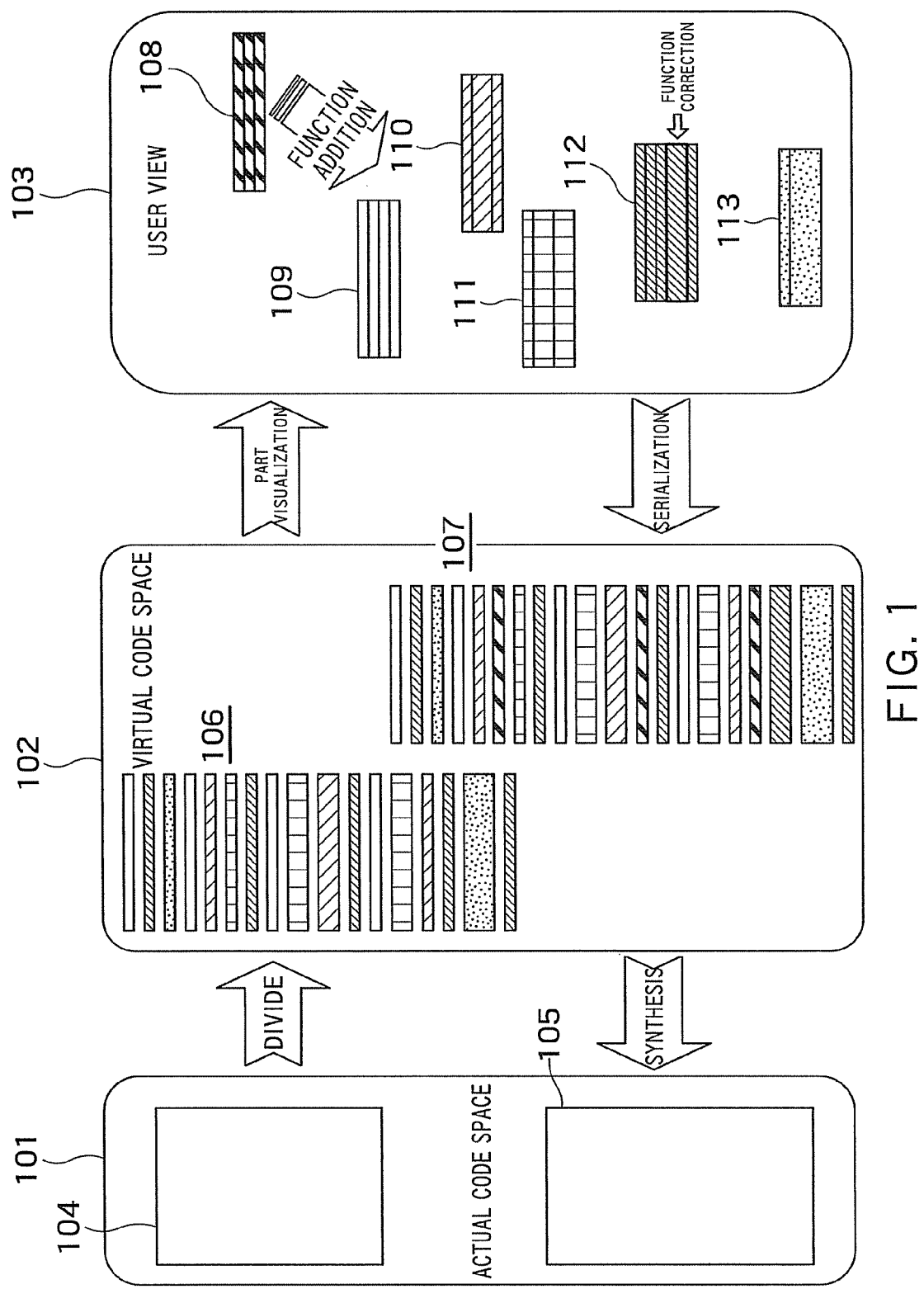
FIG. 1 shows a concept of an embodiment of the present invention.

FIG. 1 is a conceptual diagram showing operations of the software high productivity developing environment according to an embodiment of the present invention. It is assumed that a source code 104 to be currently edited has been given. It is assumed that the purpose is to perform appropriate addition or correction of functions with respect to the source code 104 to obtain an improved source code 105. The source code 104 and the improved source code 105 are final products to be actually compiled, and are defined to exist in an actual code space 101.

In conventional software development, the addition or the correction of the functions have been performed by directly editing the source code 104 on the actual code space 101. However, there has been a problem of low maintainability of the source code 104.

Ideally, when a state is considered in which the respective functions included in the source code 104 have been independently implemented, for example, the source code 104 includes functional units (groups) 109 to 113, it is considered that productivity is increased if various maintenance tasks, for example, such as adding a functional unit 108 and correcting the functional unit 112, are performed in such an environment in a user view 103.

In order to virtually give such a representation as this user view 103 and reflect results of the addition or the correction of the functions on the actual code space 101, it is necessary to prepare a virtual code space 102 and combine an actual code with the addition or the correction of the functions. Divided source codes 106 and 107 on the virtual code space 102 hold states in which the source codes 104 and 105 have been cut out into the functional units and virtually divided, respectively.

In other words, this embodiment enables to divide the source code 104 to virtually prepare the divided source code 106, and based on this, provide the functional units 109 to 113 as the user view 103. On the user view 103, functions, which enable to add the functional unit 108, perform correction tasks with respect to the functional unit 112 and the like, have been provided, and the productivity has been dramatically improved more than the direct editing tasks with respect to the original source code 104. Results of editing performed on the user view 103 are serialized with respect to the divided source code 106 on the virtual code space 102, and accordingly the new divided source code 107 is synthesized. Based on information in this divided source code 107, it is possible to automatically reflect modification on the source code 104 on the actual code space (synthesis) and eventually obtain the improved source code 105.

Figure 2:
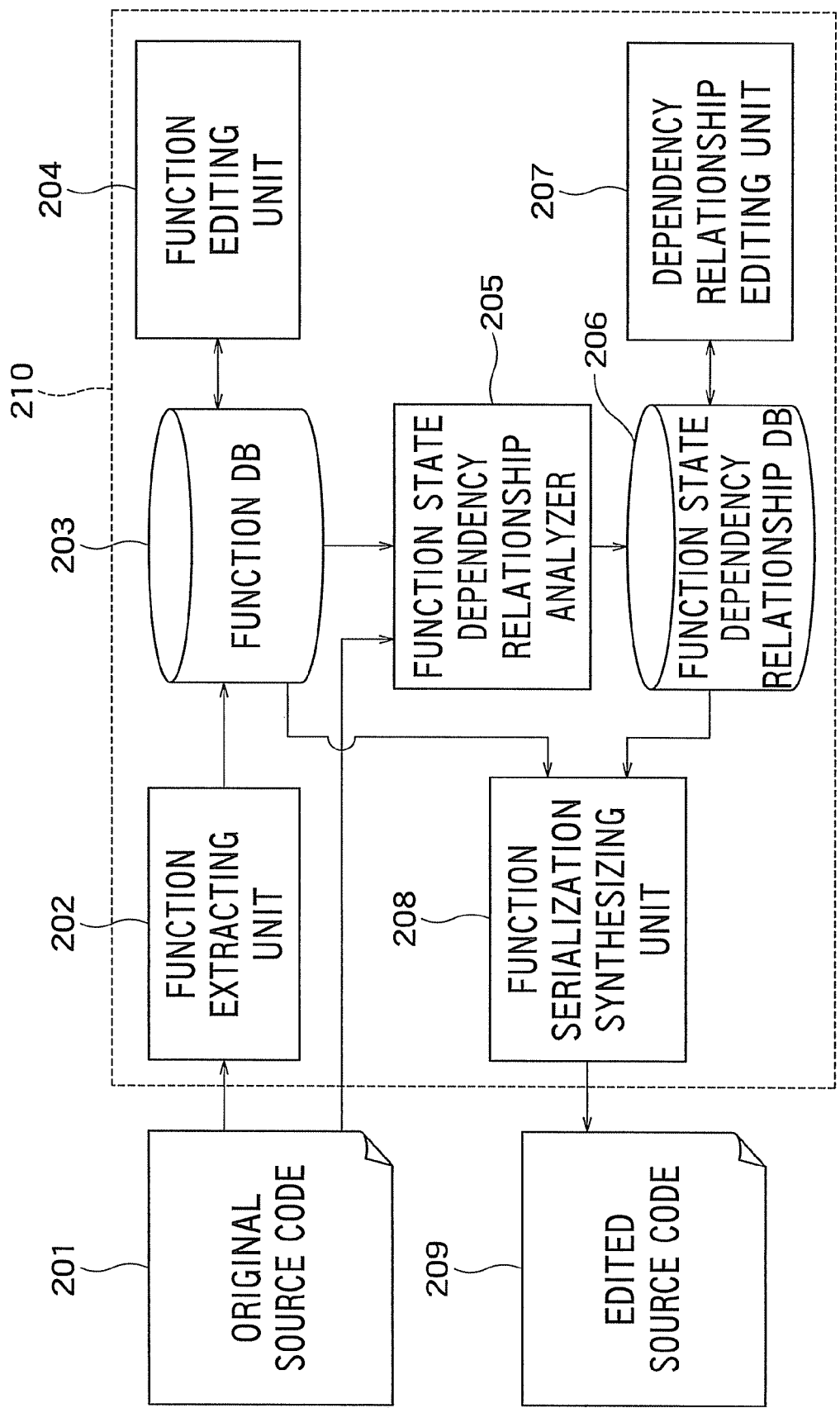
FIG. 2 is a block diagram showing a basic configuration of an embodiment of the present invention.

Next, an embodiment of the present invention for embodying the above described concept is shown in FIG. 2. An original source code 201 corresponds to the source code 104 of FIG. 1, and an edited source code 209 corresponds to the improved source code 105 of FIG. 1.

A program developing apparatus 210 as the embodiment of the present invention is provided with five independent functioning units 202, 204, 205, 207 and 208 and two independent databases (DB) 203 and 206. The databases correspond to storages, for example. For example, a process by each functioning unit may be realized as execution of a program module corresponding to each functioning unit.

A function extracting unit (dividing unit, partitioning unit) 202 is one of functions configuring the core of the present invention. Although an implementation example of this function will be described in detail later, it is basically for cutting out the independent functional units from the original source code 201. When the functional units are cut out, they are cut out so that the functions in the respective functional units are independent respectively, and also it is recognized how internal states (described below) the respective functional units can take. Specifically, it becomes possible by applying techniques such as program slicing and def-use analysis. For example, although it is schematic, when the functional unit 109 in FIG. 1 is taken as an example, it is shown that this functional unit has four internal states (this functional unit is partitioned into four sections. For example, a value of an internal variable is constant within one section). Specifically, this recognition of the internal states of the respective functional units becomes possible by applying the technique referred to as the def-use analysis. The respective functional units cut out by the function extracting unit 202 are registered in a function DB 203 and managed. Among the respective functional units registered in the function DB 203 and within one functional unit, execution order relationships in units of rows of the original source code are retained.

A function editing unit (first editing unit, first exhibiting unit) 204 provides the user view 103 of FIG. 1 while interfacing a user. The function editing unit 204 retrieves the functional units from the function DB 203 so that the user can freely edit them. The function editing unit 204 performs editing according to an editing command (first editing command) from the user. As the editing, in addition to modification and deletion of the functional units, addition of a new functional unit can also be performed. The functional unit created here is registered in the function DB 203, and managed.

A function state dependency relationship analyzer (setting unit) 205 analyzes dependency relationships of the internal states among the respective functional units registered in the function DB (sets constraints of an execution order of code groups (respective sections) which define the respective internal states). Partial order relationships among the internal states (which denote order relationships of the respective internal states, however, the order relationships may not exist among some internal states) and also time constraints and the like are recognized as the dependency relationships here. As the time constraints, for example, there are considered a constraint in which an operation of a certain port can be performed only after a value is written in a particular register, a constraint in which a particular time operation is delayed for waiting for completion of an operation of hardware in some cases, and the like. The partial order relationships and the time constraints can be represented as directed graphs among the internal states (the respective sections can be connected to one another with directed arcs among the above described functional units). In other words, the function state dependency relationship analyzer 205 sets the constraints of the execution order of the respective sections. Here, the point is mainly that the dependency relationships are analyzed based on information included in the original source code 201. Here, considering that a dependency relationship editing unit 207 provides means for editing the dependency relationships of the internal states, it is considered that it is appropriate to also extract a dependency relationship regarded as redundant, rather than omitting it. However, if necessary, it is also possible to implement an algorithm which can detect only an optimal dependency relationship set. The dependency relationships of the internal states analyzed in this way are registered in a function state dependency relationship DB 206 and managed.

A dependency relationship editing unit (second editing unit, second exhibiting unit) 207 provides the user with an interface for editing the dependency relationships of the internal states (the constraints of the execution order with respect to the sections among the functional units). The dependency relationship editing unit 207 performs the editing according to an editing command (second editing command) from the user. The editing includes, for example, modification, addition and deletion. The reason why this dependency relationship editing unit 207 is required is mainly divided into two reasons. One is for removing or replacing the relationship regarded as redundant in the dependency relationships detected by the function state dependency relationship analyzer 205. The other is for appropriately adding, modifying or deleting the dependency relationships if a new function is added or the function is corrected by the function editing unit 204.

As described above, after necessary maintenance tasks (editing tasks) are performed with respect to the functional units registered in the function DB 203 and a set of the internal state dependency relationships registered in the function state dependency relationship DB 206, the edited source code 209 is syntheseized by a function serialization synthesizing unit (synthesizing unit) 208. The edited source code 209 may be generated from the function DB 203 before being edited, the function state dependency relationship DB 206 before being edited, and the editing command inputted by the user. Also, the edited source code 209 may be generated by obtaining necessary correction difference information with respect to the original source code 201 from the edited function DB 203 or the edited function state dependency relationship DB 206, and applying the obtained correction difference information to the original source code 201. In the latter case, the modification with respect to the original source code 201 can be kept to the minimum. In other words, since the internal states among the respective functional units have the partial order relationships (because there is no constraint of the order relationships among some internal states), when the edited source code is generated as the former from the function DB 203 before being edited, the function state dependency relationship DB 206 before being edited, and the editing command inputted by the user, the execution order may be changed from the original source code. Therefore, when it is desirable to keep the modification of the execution order to the minimum, it is preferable to add the difference information to the original source code 201.

Next, source code correction tasks using the embodiment of the present invention will be shown by using examples. A source code 301 in FIG. 3 corresponds to the original source code 201, and a source code 401 in FIG. 4 corresponds to the edited source code 209.

Figure 3:
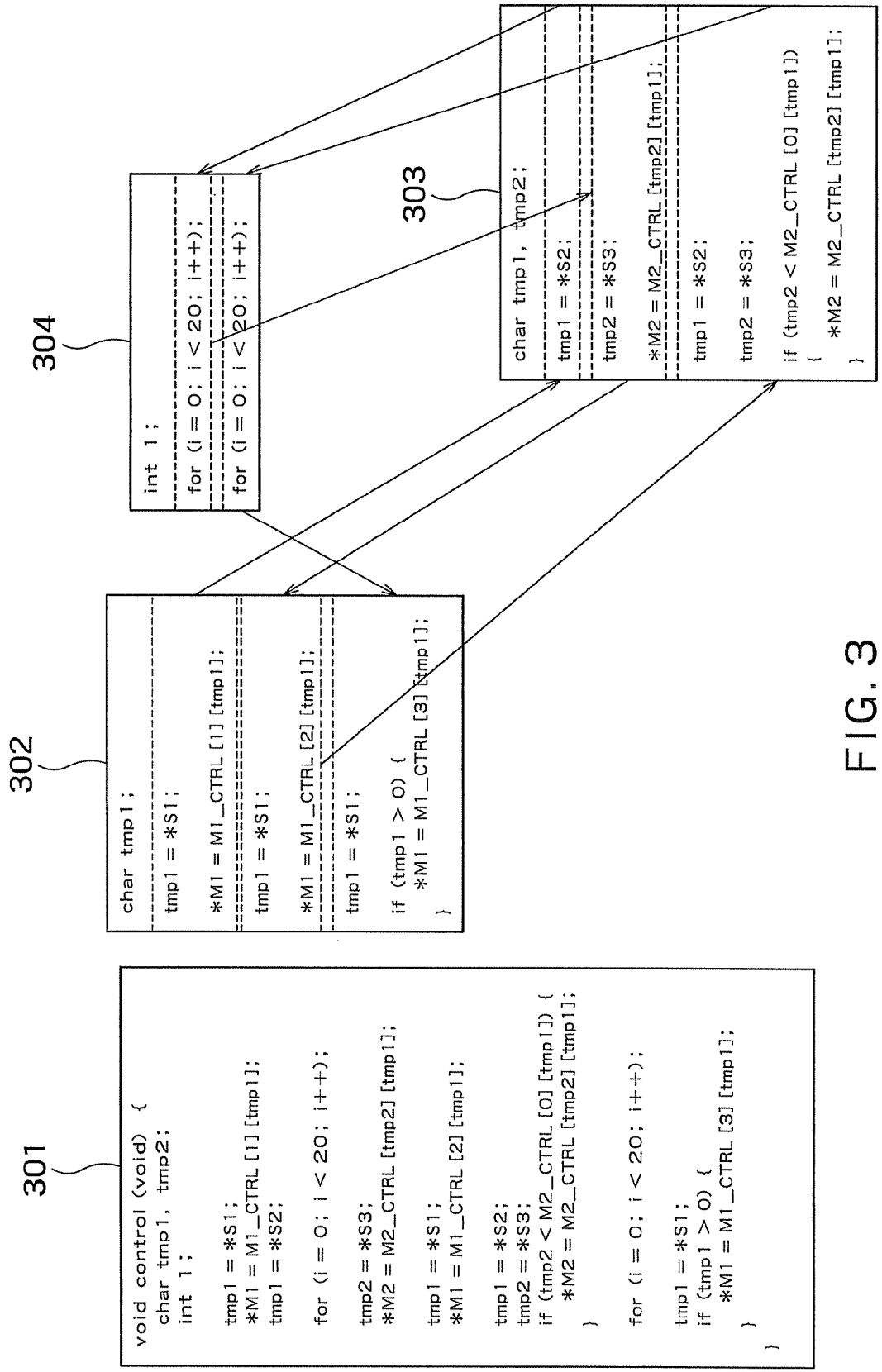
FIG. 3 shows an example of a program code to be inputted to the basic configuration of FIG. 2.

Reference numerals 302 to 304 in FIG. 3 are examples of the functional units cut out from the source code 301 by the function extracting unit 202. The source code 301 has been divided into the functional units which handle output variables having no dependency relationships with one another. "M1" and "M2" are the output variables, and the functional units 302 to 304 are obtained by specifying "M1" and "M2" by the user and applying slicing technology (predetermined algorithm). In the figure, the respective functional units are partitioned into multiple sections with horizontal dotted lines. One section corresponds to one internal state, and within one functional unit, the respective sections are arranged according to the execution order of the source code 301 in a direction from top to bottom. One section includes a code group which must be sequentially executed. For example, tmp1=*S1 and *M1=M1_CTRL[2][tmp1] in the functional unit 302 should be necessarily sequentially executed, and it should not be permitted to insert other codes between them. "tmp1" and "tmp2" are internal variables, and a state of a function "control" is regarded as constant while the internal variables are constant. The state of one "control" is handled as one internal state (section). Arrows connecting between the sections among the functional units are the dependency relationships analyzed by the function state dependency relationship analyzer 205, and can be edited by the dependency relationship editing unit 207. The arrow shows that the code group in the section to which the arrow goes is executed temporally later than the code group in the section from which the arrow goes. In FIG. 3, the source code 301 is a source code managed on the actual code space, and the functional units 302 to 304 are examples of those given as the user view.

Among them, the functional unit 304 is a special functional unit which does not contribute to the output variable. In this example, loops merely for stalling for time (processes for waiting for a predetermined time) have been cut out. In this way, variables which do not contribute to the output are bracketed and cut out. Regarding the functional unit 304, the codes on the original source code which do not contribute to the output variable are simply cut out and arranged according to the execution order of the original source code, in which one code defines one section (internal state). Moreover, regarding the dependency relationships of the respective internal states (the constraints of the execution order) within the functional unit 304, it is shown that they are also simply dependent on the internal states of adjacent functional units in the original source code.

Figure 4:
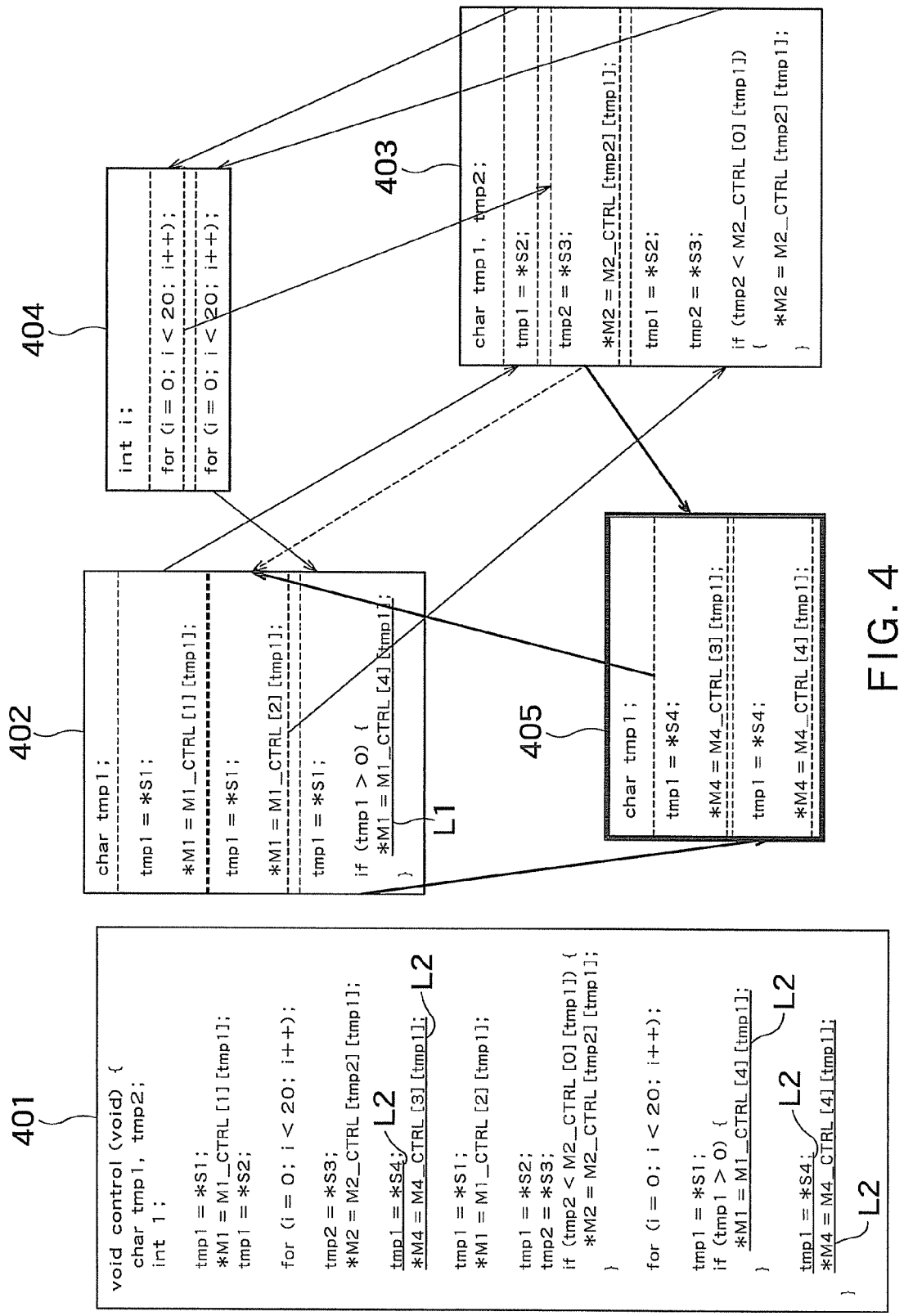
FIG. 4 shows an example of a program code to be outputted from the basic configuration of FIG. 2.

Reference numerals 402 to 404 in FIG. 4 show the result of performing the editing tasks on the user view. Here, a functional unit 404 has been newly added, and accordingly the dependency relationships (the constraints of the execution order) have been deleted (dotted line arrow) or newly added (bold line arrow). Moreover, the functional unit 402 has been partially corrected (see an underline L1).

From these source code correction tasks performed on the user view, the correction difference information with respect to the original source code is generated, and a result of correcting the original source code 301 by using this information (a result of inserting the respective codes of the added function into appropriate positions in the original source code) is a source code 401. Contents of the correction are shown with underlines L2 in the figure.

Figure 5:
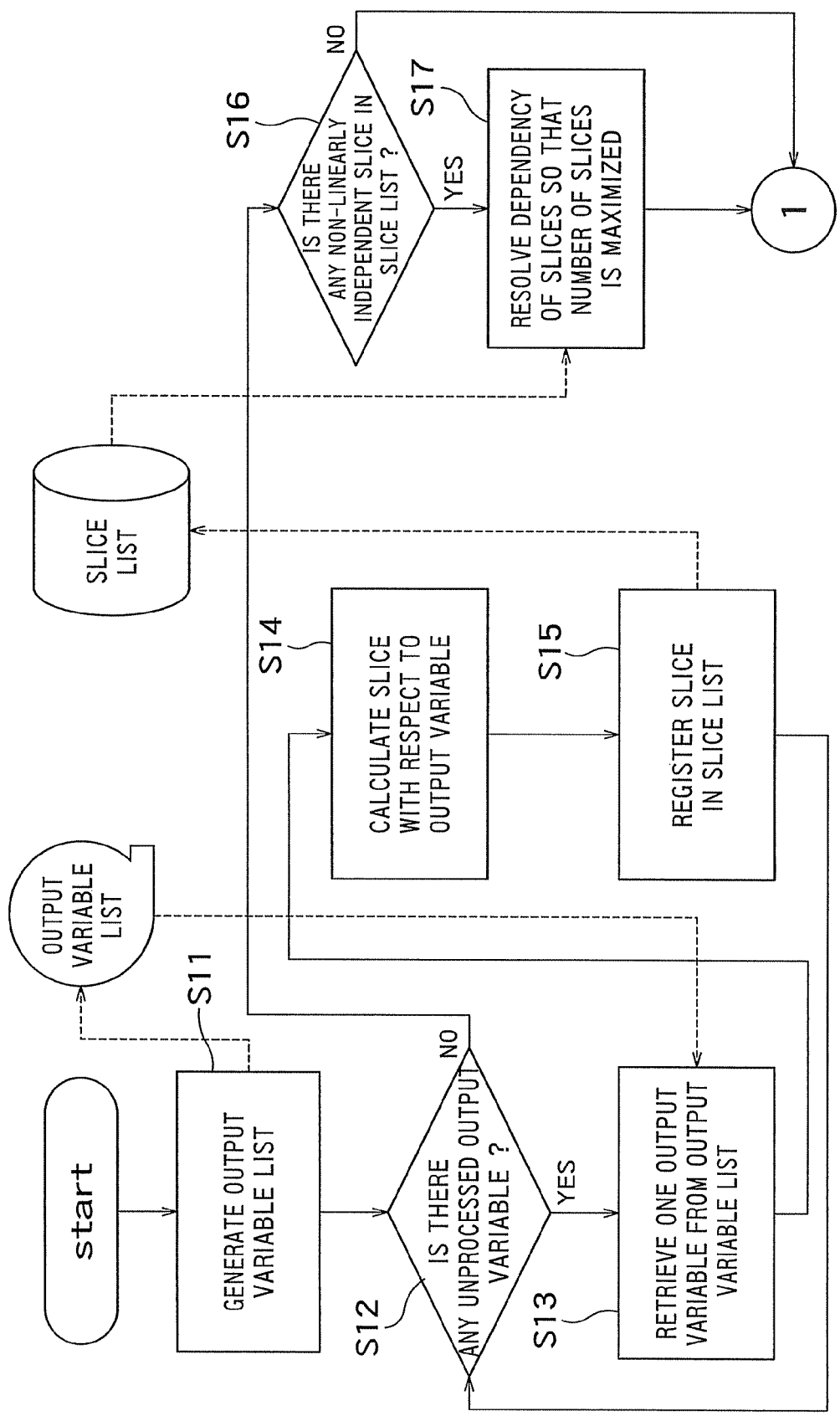
FIG. 5 shows a first half part of a flowchart illustrating an algorithm of a function extracting unit included in the basic configuration of FIG. 2.
Figure 6:
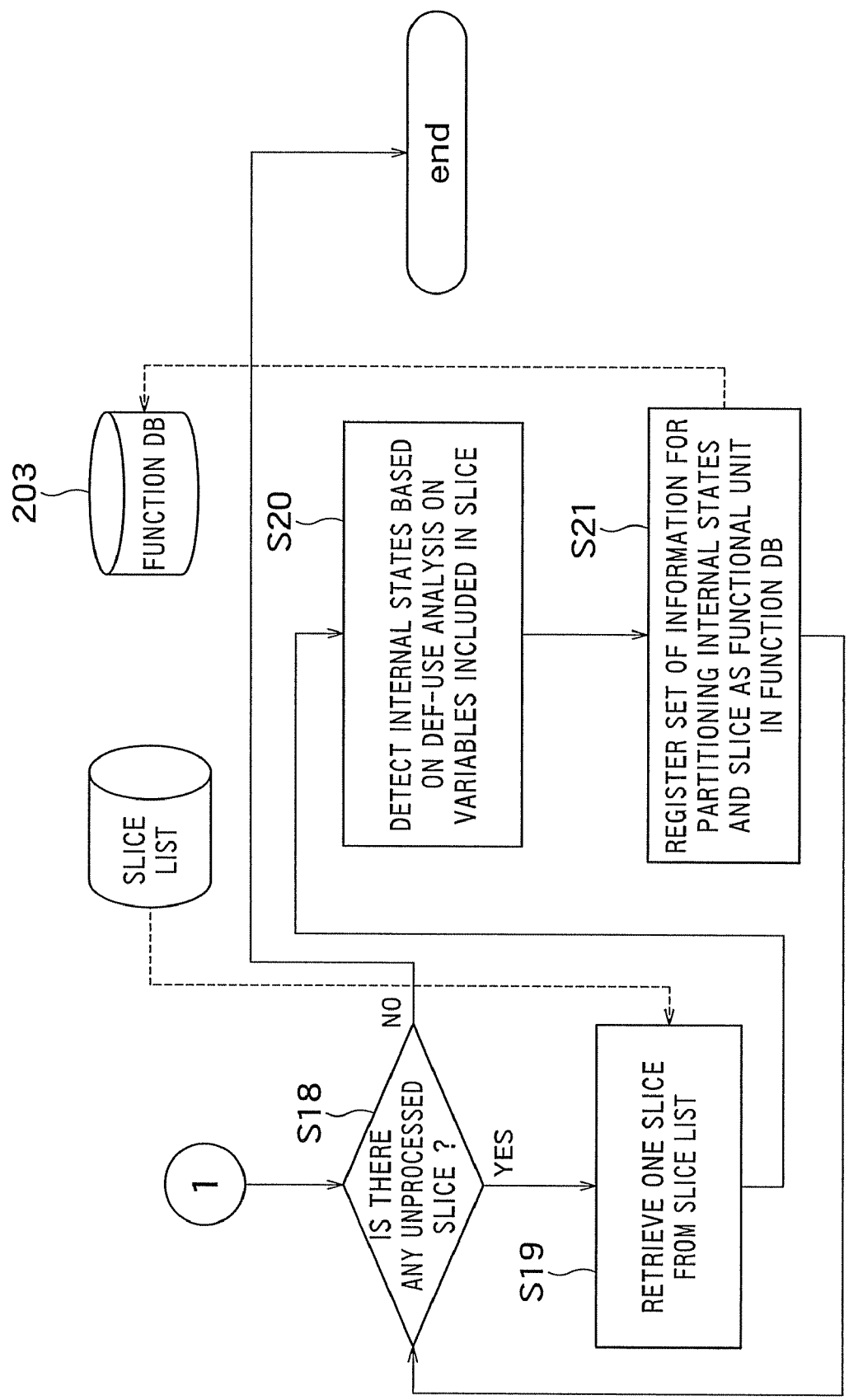
FIG. 6 shows a second half part of the above described flowchart.

Next, details of a process of the function extracting unit 202 will be explained along flowcharts shown in FIGS. 5 and 6.

Step 1: An output variable list (noticed output list) is generated (S11). The output variable list is a set of output variables which output some values to the outside, in the source code (noticed outputs). This becomes information based on which the functional units are cut out. In the case of FIG. 3, "M1" and "M2" correspond to the output variables.

Step 2: A slice is calculated with respect to each of the output variables, and the calculated slice is registered in a slice list (S12 to S15). The calculation of the slice is a technique for analyzing functions included in a program, relationships of reference and assignment with respect to the variables and the like, and extracting only parts to be noticed within the program (see M. Weiser, Program Slicing, IEEE Trans. on Software Engineering, SE-10(4), p.p. 352.357, 1984). The code group extracted from the program with respect to one output variable becomes one slice (group), and one slice corresponds to one functional unit (302, 303 or 304) in which the horizontal dotted lines defining the internal states have been removed. As described above, it should be noted that the arrows which represent the dependency relationships of the internal states among 302 to 304 (the constraints of the execution order of the sections) are added by the function state dependency relationship analyzer 205, and the arrows naturally do not exist at this time. The above operations are performed with respect to all of the output variables. The code groups which do not affect the output variable are put together in one group (304 in the example of FIG. 3).

Step 3: With all of the extracted slices as inputs, a linearly independent slice group is obtained (S16). "Linearly independent slice" shows that there is no code shared among the slices. When the linearly independent slice group is obtained, dependency of the slices is resolved so that the number of the slices is maximized (S17).

Step 4: When all of the slices have become linearly independent of one another, the def-use analysis is performed with respect to the variables (internal variables) included in the slices, and the internal states are detected (S18 to S20). The def-use analysis is an analyzing method for regarding the time after a value is assigned to a variable until the variable is referred to, as a lifetime of a particular value of the variable, and calculating the lifetime of the value of each variable. While a particular variable group included in the slice takes certain values, it can be defined that the internal states of the slice have not changed. Thus, it is possible to analyze the internal states through this analysis.

For example, when the functional unit 302 of FIG. 3 is taken as an example, tmp1=*S1; on line 2, and *M1=M1_CTRL[1][tmp1]; on line 3 have a def-use relationship with respect to the internal variable "tmp1". In other words, the assignment is performed with respect to "tmp1" on line 2 (def(ine)), and the value assigned here is referred to on line 3 (use). The relationship of these two lines is close, and basically they need to be sequentially executed. It is because if another operation for modifying the value of "tmp1" is inserted between these two lines, correctness of a result on line 3 is not ensured. The point of Step 4 is that def-use relationships are traced with respect to the respective internal variables as described above, and the states are cut and separated so that this is retained.

Step 5: A set of each slice/group and information for partitioning each slice/group into the multiple internal states (see the horizontal dotted lines of FIG. 3) is registered as the functional unit in the function DB 203 (S21).

As described above, according to this embodiment, even with respect to the source code which has been implemented with high efficiency as resource-limited software, the maintenance tasks can be facilitated for persons who execute the editing tasks, and development efficiency is expected to be improved.

In other words, it is necessary to consider debugging, function modification (including deletion), function addition and the like as the maintenance tasks. In this embodiment, it is possible to recognize the functional units and appropriately correct them, and also it is possible to give an appropriate view to a source code having low maintainability. Moreover, it is also possible to appropriately handle a severe timing constraint and the like. In addition, since the modification of the original source code can be kept to a minimum necessary range, execution efficiency of the program is hardly sacrificed.

As described above, in this embodiment, when the maintenance of the source code is performed, a view, which has been divided into the functional units, having low coupling and high cohesion is provided to facilitate the editing tasks, while it is possible to perform the addition, the correction and the like of the functions actually through the minimal modification with respect to the original source code.

What is claimed is:

1. A program developing apparatus comprising:
a processor coupled to a memory, the memory stores instructions that are executed by the processor;
a dividing unit configured to divide codes included in a first source code into a plurality of groups virtually corresponding to independent output variables;
a partitioning unit configured to partition each group into one or more sections corresponding to detected internal states based on def-use analysis on the independent output variables included in the group made up of one or more codes which should be sequentially executed;
a storage configured to store the sections, each having one or more codes;
a setting unit configured to set constraints of an execution order among the sections on a basis of the first source code;
a first exhibiting unit configured to exhibit contents of the storage to a user;
a second exhibiting unit configured to exhibit constraint information representing the constraints of the execution order to the user;
a first editing unit configured to edit the contents of the storage based on a first editing command from the user;
a second editing unit configured to edit the constraint information based on a second editing command from the user; and
a synthesizing unit configured to synthesize the first source code and edited contents of the storage into a second source code according to edited constraint information.

2. The apparatus according to claim 1, wherein the second exhibiting unit exhibits the constraint information to the user by connecting the sections to one another with directed arcs.

3. The apparatus according to claim 1, wherein the first editing unit newly adds a section to the storage, or modifies or deletes the section in the storage.

4. The apparatus according to claim 3, wherein the second editing unit adds, deletes and modifies the constraints of the execution order.

5. The apparatus according to claim 1, wherein first to nth (n is an integer of 1 or more) of the groups are sets of codes which affect same output variable, respectively, and output variables corresponding to the first to nth groups are independent of one another.

6. The apparatus according to claim 5, wherein n+1th of the groups is a set of codes which are irrelevant to an output variable.

7. The apparatus according to claim 6, wherein the n+1th group is a group which performs a process for satisfying a required time constraint.

8. The apparatus according to claim 1, wherein the partitioning unit partitions each group based on relationships of assignment and reference with respect to an internal variable.

9. The apparatus according to claim 1, wherein the synthesizing unit generates the second source code by correcting the first source code based on a difference between a set of the contents of the storage after being edited and the edited constraint information, and a set of the contents of the storage before being edited and the constraint information before being edited.

10. The apparatus according to claim 1, wherein the synthesizing unit generates the second source code from the contents of the storage after being edited and the edited constraint information.

11. A program developing method comprising:
using a processor to execute the following instructions:
dividing codes included in a first source code into a plurality of groups virtually corresponding to independent output variables;
partitioning each group into one or more sections corresponding to detected internal states based on def-use analysis on the independent output variables included in the group made up of one or more codes which should be sequentially executed;
store the sections, each having one or more codes, in a storage;
setting constraints of an execution order among the sections on a basis of the first source code;
exhibiting contents of the storage to a user;
exhibiting constraint information representing the constraints of the execution order to the user;
editing the contents of the storage based on a first editing command from the user;
editing the constraint information based on a second editing command from the user; and
synthesizing the first source code and edited contents of the storage into a second source code according to edited constraint information.

12. The method according to claim 11, wherein the constraint information is exhibited to the user by connecting the sections to one another with directed arcs.

13. The method according to claim 11, wherein the editing of the contents in the storage is performed by newly adding a section to the storage, or modifies or deletes the section in the storage.

14. The method according to claim 13, wherein the editing of the constraint information is performed by adding, deleting and modifying the constraints of the execution order.

15. The method according to claim 11, wherein first to nth (n is an integer of 1 or more) of the groups are sets of codes which affect same output variable, respectively, and output variables corresponding to the first to nth groups are independent of one another.

16. The method according to claim 15, wherein n+1th of the groups is a set of codes which are irrelevant to an output variable.

17. The method according to claim 16, wherein the n+1th group is a group which performs a process for satisfying a required time constraint.

18. The method according to claim 11, wherein each group is partitioned based on relationships of assignment and reference with respect to an internal variable.

19. The method according to claim 11, wherein the second source code is generated by correcting the first source code based on a difference between a set of the contents of the storage after being edited and the edited constraint information, and a set of the contents of the storage before being edited and the constraint information before being edited.

20. The method according to claim 11, wherein the second source code is generated from the edited contents of the storage and the edited constraint information.

21. A non-transitory computer readable storage medium storing a computer program for causing a computer to execute instructions to perform the steps of:
dividing codes included in a first source code into a plurality of groups virtually corresponding to independent output variables;
partitioning each group into one or more sections corresponding to detected internal states based on def-use analysis on the independent output variables included in the group made up of one or more codes which should be sequentially executed;

store the sections, each having one or more codes in a storage;

setting constraints of an execution order among the sections on a basis of the first source code;

exhibiting contents of the storage to a user;

exhibiting constraint information representing the constraints of the execution order to the user;

editing the contents of the storage based on a first editing command from the user;

editing the constraint information based on a second editing command from the user; and synthesizing the first source code and edited contents of the storage into a second source code according to edited constraint information.

* * * * *